(12) United States Patent
Hernandez Ortiz

(10) Patent No.: US 11,548,769 B2
(45) Date of Patent: Jan. 10, 2023

(54) CHAIN LINK ADAPTER

(71) Applicant: Toyota Motor Engineering & Manufacturing North America, Inc., Plano, TX (US)

(72) Inventor: Mario E. Hernandez Ortiz, Tecate (MX)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 1199 days.

(21) Appl. No.: 16/049,583

(22) Filed: Jul. 30, 2018

(65) Prior Publication Data

US 2020/0031635 A1    Jan. 30, 2020

(51) Int. Cl.
*B66C 15/00* (2006.01)
*F16G 11/00* (2006.01)

(52) U.S. Cl.
CPC .............. *B66C 15/00* (2013.01); *F16G 11/00* (2013.01)

(58) Field of Classification Search
CPC ......... B66C 15/00; B66C 15/02; F16G 11/00; F16B 3/00; B66D 3/12; B66D 3/26
See application file for complete search history.

(56) References Cited

U.S. PATENT DOCUMENTS

| 2,373,048 | A   |   | 4/1945  | Parker et al. |
| 2,630,255 | A   | * | 3/1953  | Finder ................... G10G 5/005 |
|           |     |   |         | 224/268 |
| 2,647,725 | A   |   | 8/1953  | Coffing |
| 3,596,879 | A   |   | 8/1971  | Clark |
| 4,858,977 | A   | * | 8/1989  | Mitchell ................... B66C 1/34 |
|           |     |   |         | 294/82.11 |
| 6,352,243 | B1  |   | 3/2002  | Samejima |
| 6,966,544 | B2  |   | 11/2005 | McCormick et al. |
| 7,300,036 | B2  |   | 11/2007 | Dinius |
| 7,441,749 | B2  |   | 10/2008 | Beaudoin et al. |
| 10,233,058 | B2 | * | 3/2019  | Williams ................ B66C 15/00 |

(Continued)

FOREIGN PATENT DOCUMENTS

AU    2015200710 B1    8/2015

OTHER PUBLICATIONS

Throttle Body Injection Spacer; Spectre Performance; 2 pages; 2016.

(Continued)

*Primary Examiner* — David M Upchurch
(74) *Attorney, Agent, or Firm* — Snell & Wilmer LLP

(57) ABSTRACT

A system for providing safety to a hoist having a hook and a chain. The system includes a safety cable threaded through an opening of the hook or an object to be lifted. The system includes a connector connected to the safety cable and the chain such that when the hook and the chain of the hoist are disconnected, the object remains connected to the chain via the connector and safety cable. The connector includes a base portion having a chain opening configured to receive the chain, and a first cable opening configured to receive the safety cable. The connector includes a top portion configured to be coupled to the base portion and cover a portion of the chain opening such that the base portion and the top portion, when coupled together, remain at a substantially fixed position along the length of the chain.

19 Claims, 13 Drawing Sheets

(56) References Cited

U.S. PATENT DOCUMENTS

| | | | |
|---|---|---|---|
| 2005/0043132 A1 | 2/2005 | Moll et al. | |
| 2010/0065176 A1* | 3/2010 | Pengg | B60C 27/08 |
| | | | 152/241 |
| 2013/0257071 A1* | 10/2013 | Kutsen | B66C 1/125 |
| | | | 294/82.1 |
| 2017/0217738 A1* | 8/2017 | Saker | B66C 13/23 |
| 2017/0217739 A1* | 8/2017 | Williams | B66C 13/46 |

OTHER PUBLICATIONS

TGL Snatch Block, Pulley Block, 22,000 lb WLL with Grease Fitting; TGL Global; 3 pages; 2018.
Lever Hoist Link Chain Guide; McKinnon; 5 pages; 2018.
Chain Stop Assembly; Budgit Hoists; 1 page; 2018.
Block Lower Hook Chain; CM Hoists; 1 page, 2018.
Airaid 300-560 Throttle Body Spacer; Alligator Performance; 2 pages; 2016.

* cited by examiner

CHAIN LINK ADAPTER

BACKGROUND

1. Field

This specification relates to an apparatus for securing a safety cable to a chain.

2. Description of the Related Art

Hoists are used in manufacturing environments to lift heavy objects. Conventional hoists may include a hook at one end of a chain, and the hook may engage the object to be lifted. The other end of the chain may be attached to a cylinder or a drum that is rotated to wind the chain around the cylinder or the drum. As the cylinder or the drum is rotated, the chain is further wound, and the object is lifted. The chain is connected to the hook by a connector or the chain may be welded to the hook. In some situations, the connector or the welding fails, and the hook may separate from the end of the chain. In order to provide a safety mechanism, conventionally, a safety cable is threaded through one of the links of the chain above the connection between the chain and the hook, and also through the hook.

However, by threading the safety cable through the chain link and through the hook, the safety cable may be susceptible to wear, and may also fail when the connector connecting the chain to the hook fails, defeating the purpose of the safety cable. Therefore, an improved way of connecting the chain to the safety cable is desirable.

SUMMARY

What is described is a connector for securing a safety cable to a chain. The connector includes a base portion. The base portion includes a chain opening configured to receive the chain such that the base portion freely moves along the length of the chain. The base portion also includes a first cable opening configured to receive the safety cable. The connector also includes a top portion configured to be coupled to the base portion and cover a portion of the chain opening such that the base portion and the top portion, when coupled together, remain at a substantially fixed position along the length of the chain.

Also described is a system for providing safety to a hoist having a hook attached to a chain. The system includes a safety cable threaded through an opening of the hook or an opening of an object lifted by the hoist. The system also includes a connector connected to the safety cable and the chain such that when the hook and the chain of the hoist are disconnected, the object remains connected to the chain via the connector and the safety cable. The connector includes a base portion having a chain opening configured to receive the chain such that the base portion freely moves along the length of the chain, and a first cable opening configured to receive the safety cable. The connector also includes a top portion configured to be coupled to the base portion and cover a portion of the chain opening such that the base portion and the top portion, when coupled together, remain at a substantially fixed position along the length of the chain.

Also described is a method of using a connector to secure a safety cable to a chain of a hoist. The chain is connected to a hook for engaging an object to be lifted by the hoist. The method includes placing the chain through a chain opening of a base portion of the connector. The method also includes placing a top portion of the connector onto the base portion such that a bottom surface of the top portion contacts a top surface of the base portion and a chain securing slot of the top portion surrounds a central link of the chain. The method also includes attaching the top portion of the connector to the base portion of the connector using one or more fasteners. The method also includes threading the safety cable through an opening of the hook or an opening of the object. The method also includes threading the safety cable through a first cable opening and a second cable opening of the connector.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
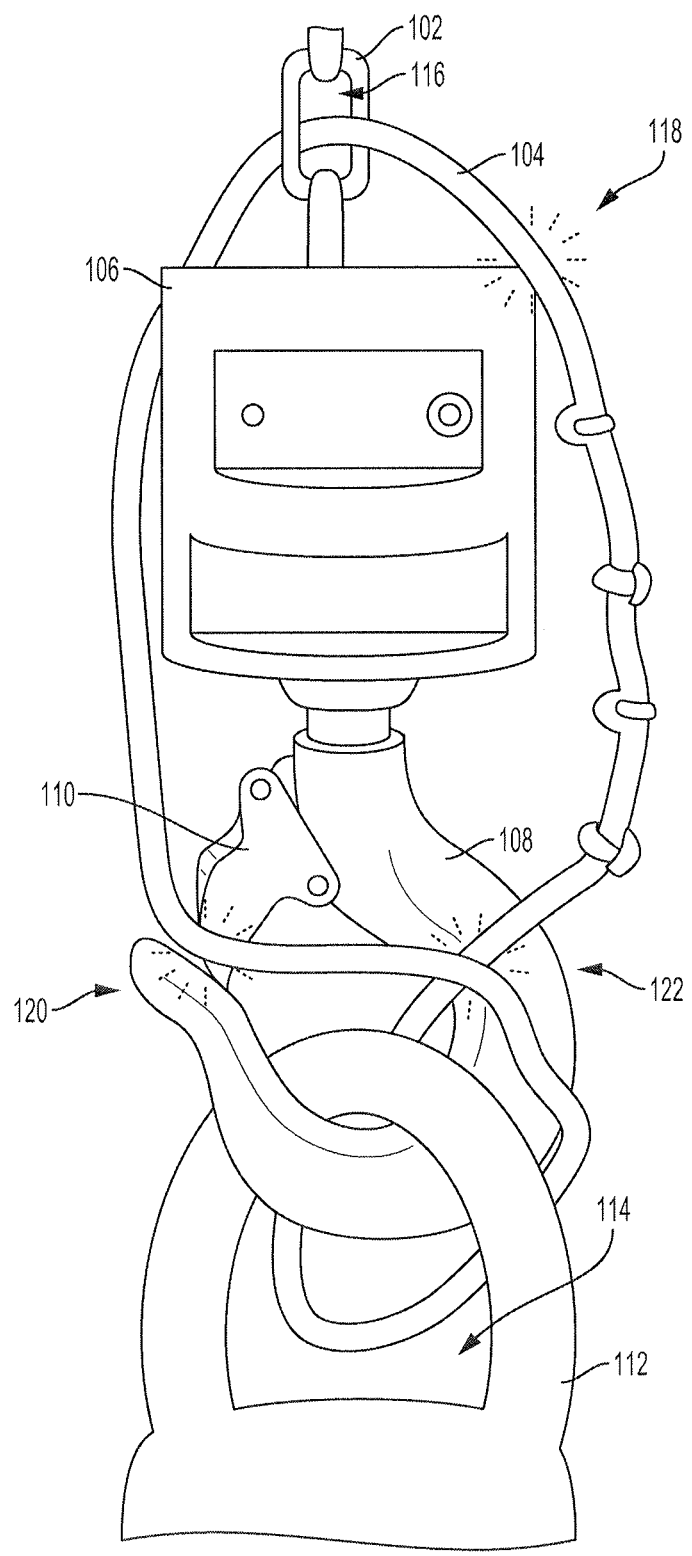
FIG. 1 illustrates a prior art safety cable used with a hoist.

Disclosed herein are systems, vehicles, and methods for securing a safety cable to a chain of a hoist. Conventionally, the safety cable is threaded through one of the links of the chain and looped through the hook. This is illustrated in FIG. 1.

The hoist includes a chain 102 connected to a hook 108 via a connector 106. The connector 106 receives one or more links of the chain 102 on one end and the hook 108 on the other end. The hook 108 is hooked through an opening 114 of the object 112 to be lifted. The object 112 is secured within the hook 108 by a latch 110.

In some situations, the connection between the chain 102 and the hook 108 is broken. In some situations, the connection between the chain 102 and the connector 106 fails. In some situations, the connection between the hook 108 and the connector 106 fails. In these situations, a safety cable 104 may prevent the object 112 from falling onto the ground. If the object 112 falls onto the ground, not only may the object 112 be damaged, but objects or things below the object 112 or in the vicinity of the object 112 may be harmed.

The safety cable 104 is threaded through a loop or opening 116 of one of the links of the chain 102 and is also threaded through the hook 108. When the chain 102 is separated from the hook 108 by a failure of the connector 106, the safety cable 104 may maintain support of the object 112 by maintaining the connection between the chain 102 (at the opening 116) and the hook 108. In some embodiments, the safety cable 104 may be threaded through the opening 114 of the object 112 itself.

This arrangement has significant shortcomings. In order for the safety cable 104 to be threaded through a chain link, the safety cable 104 may have to be relatively thin (e.g., ⅛ of an inch or less in diameter). As the safety cable 104 is thin, it may wear down at any point there is friction with another metal object. The safety cable 104 is conventionally made of a braided metal wire.

The safety cable 104 may make contact with a top edge of the connector 106 and become worn down at a first wear location 118. The safety cable 104 may make contact with the latch 110 of the hook 108 and may become worn down at a second wear location 120. The safety cable 104 may make contact with the object 112 and the hook 108 and become worn down at a third wear location 122. In any of these wear locations, the safety cable 104 may be worn down to a point where it is unable to support the weight of the object 112, and may also fail when the connector 106 fails.

An improved method or apparatus for connecting a safety cable to a chain link in a hoist would improve the safety of the system, as well as the durability of the safety cable.

Figure 2:
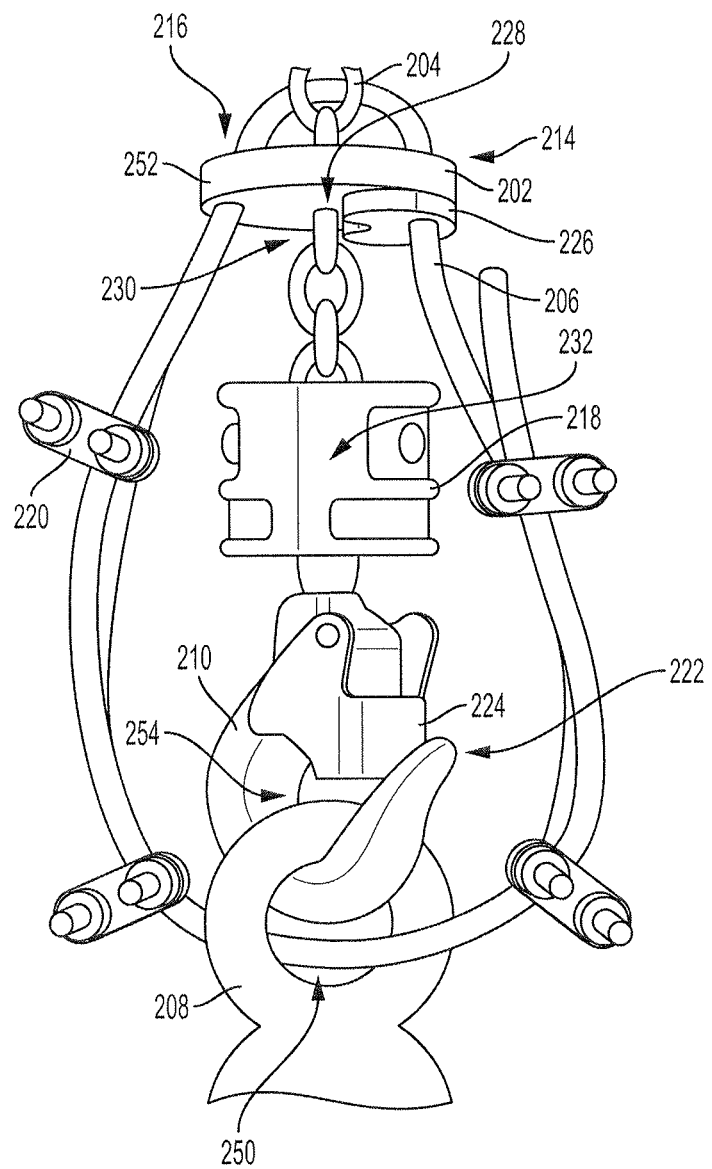
FIG. 2 illustrates an example use of the chain link adapter, according to various embodiments of the invention.

FIG. 2 illustrates a chain link adapter for connecting the safety cable to the chain. The chain link adapter 202 is connected to the chain 204 at a location 230 above a location 232 where the hook connector 218 connects the hook 210 to the chain 204.

The chain link adapter 202 surrounds the chain 204 at an opening 228 and secures a link of the chain 204. The chain link adapter 202 also receives a safety cable 206. The safety cable 206 may be threaded through a first opening 214 and a second opening 216 of the chain link adapter 202. The safety cable 206 may also be threaded through the opening 254 of the hook 210 or the opening 250 of the object 208 to be lifted. The opening 250 of the object 208 may pass through the tip 222 of the hook 210 and past the latch 224 of the hook 210. The ends of the safety cable 206 may be secured by multiple clamps 220 to form a closed loop using the safety cable 206.

In this way, if the hook connector 218 connecting the chain 204 to the hook 210 fails (e.g., the chain 204 is disconnected from the connector 218 and/or the hook 210 is disconnected from the connector 218), the chain link adapter 202 maintains the connection between the chain 204 and the object 208 via the safety cable 206 and the hook 210.

As compared to the arrangement of the safety cable of FIG. 1, the safety cable 206 of FIG. 2 does not have any wear locations where the safety cable 206 may abrade against any other part of the system. In addition, because the safety cable 206 of FIG. 2 no longer has to be threaded through an opening of a chain link, the safety cable 206 may be thicker in diameter (e.g., greater than ⅛ inch), and thus, stronger and more resilient than a safety cable that must fit within an opening of a chain link. The first opening 214 and the second opening 216 of the chain link adapter 202 may be sized to accommodate any thickness of the safety cable 206.

In some embodiments, the chain link adapter 202 includes a base portion 252, which includes a screw support 226, which provides structural support for screws or bolts, as will be described further herein.

FIGS. 3A-3E illustrates a process of installing or attaching the chain link adapter to a chain and a safety cable, according to embodiments of the invention.

Figure 3A:
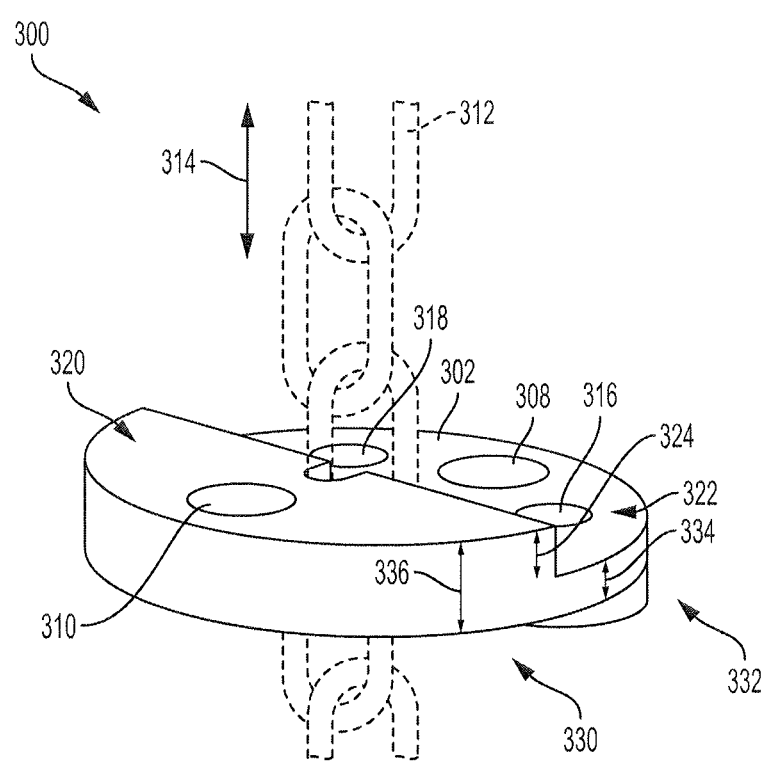
FIGS. 3A-3E illustrate various views of the chain link adapter in use, according to various embodiments of the invention.

FIG. 3A illustrates a base portion 302 of the chain link adapter 300 (e.g., chain link adapter 202). The base portion 302 includes a first cable opening 308 (e.g., first opening 214) configured to receive the safety cable and a second cable opening 310 (e.g., second opening 216) configured to receive the safety cable. The base portion 302 also includes a chain opening (obscured in FIG. 3A but shown in FIG. 3B) that is configured to receive a chain 312 and configured to allow the chain 312 to move freely along a length 314 of the chain 312. The base portion 302 also includes a first fastener opening 316 and a second fastener opening 318, which are configured to receive a fastener, as described further herein.

The base portion 302 may be made of any rigid and durable material, such as metal. The base portion 302 is shaped such that there are two parallel top surfaces—a first top surface 320 and a second top surface 322. The first top surface 320 and the second top surface 322 each lie along respective planes separated by a height 324. The base portion 302 may also have a first section 330, which has the first top surface 320, and the base portion 302 may also have a second section 332, which has the second top surface 322. The second section 332 may be referred to as a basin and the first section 330 may be referred to as a plateau. The first section 330 may have a first thickness 336 and the second section 332 may have a second thickness 334. The first thickness 336 may be a sum of the second thickness 334 and the height 324 separating the respective planes of the first top surface 320 and the second top surface 322.

Figure 3B:
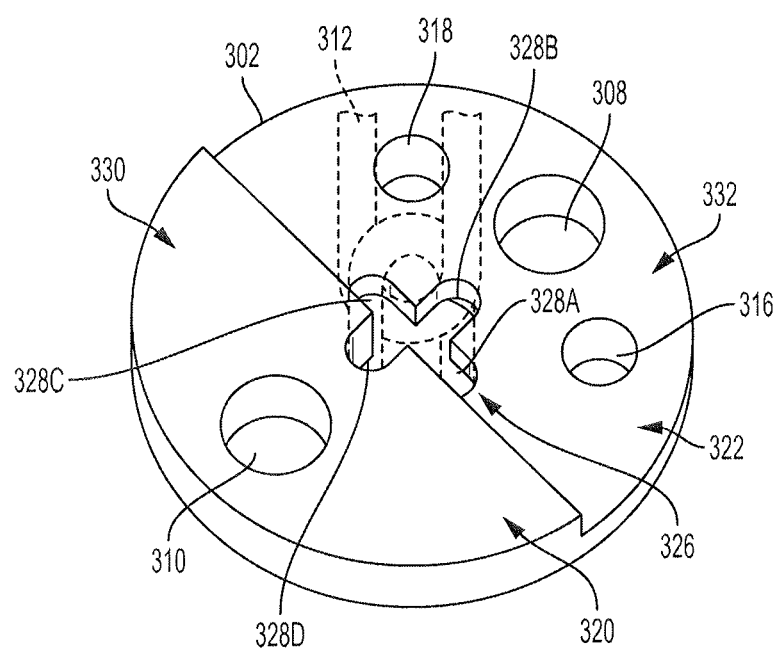

FIG. 3B illustrates a different view of the base portion 302 receiving a chain 312 shown in FIG. 3A. The view of FIG. 3B shows the chain opening 326 of the base portion 302. The chain opening 326 is configured to receive the chain 312 and allow the chain 312 to pass through the base portion 302. The chain opening 326 is shown as being cross-shaped, but may be any shaped opening that allows the chain 312 to pass through. The cross-shaped opening provides for reduced lateral movement of the chain 312 as it passes through the chain opening 326 of the base portion 302.

As shown in FIG. 3B, the cross-shaped chain opening 326 has four arms 328A-328D. Three of the arms 328A-328C are located in the second section 332 of the base portion 302, and a single arm 328D is located in the first section 330 of the base portion 302. In some embodiments, all of the arms 328A-328D (i.e., the entire chain opening 326) may be located in the first section 330. In other embodiments, all of the arms 328A-328D (i.e., the entire chain opening 326) may be located in the second section 332.

Figure 3C:
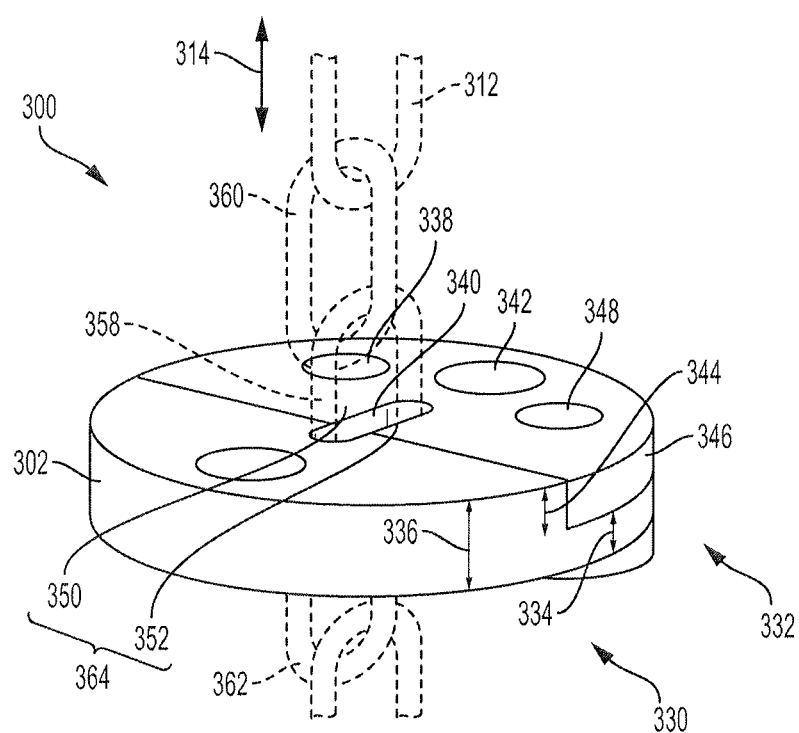

FIG. 3C illustrates a top portion 346 placed on top of the second section 332 of the base portion 302. The top portion 346 has a thickness 344. In some embodiments, the first thickness 336 of the first section 330 of the base portion 302 may be equal to the sum of the thickness 344 of the top portion 346 and the second thickness 334 of the second section 332 of the base portion 302. The top portion 346 may be made of a rigid and durable material, such as metal, and may be made of the same material as the base portion 302 or may be made of a different material.

The top portion 346 includes a top portion cable opening 342 that aligns with the first cable opening 308 of the base portion 302, such that a safety cable may pass through both the top portion cable opening 342 and the first cable opening 308. The top portion 346 also has a first top portion fastener opening 348 that aligns with the first fastener opening 316 of the base portion 302 and a second top portion fastener opening 338 that aligns with the second fastener opening 318 of the base portion 302.

The top portion 346 is configured to limit a vertical movement of the chain link adapter 300 along the length 314 of the chain 312. The top portion 346 has a chain securing slot 340 that aligns with the second arm 328B (shown in FIG. 3B) and center of the chain opening 326 of the base portion 302, but does not include an opening corresponding to the first arm 328A and the third arm 328C (shown in FIG. 3B) of the chain opening 326 of the base portion 302. In this way, the top portion 346 limits the vertical movement of the chain link adapter 300 along the length 314 of the chain 312 by preventing the links above and below the link located in the chain securing slot 340 from passing through the chain link adapter 300.

The link located in the chain securing slot 340 may be referred to as a central link 358. While the term "central" is being used, the central link 358 is not necessarily located in a central portion of the chain 312 as a whole. The central link 358 is located below the top link 360 and above the bottom link 362. The central link 358 is perpendicular to the top link 360 and the bottom link 362 when viewed axially along the length 314 of the chain 312. When the top portion 346 is engaged with the base portion 302, the top portion 346 prevents the top link 360 and the bottom link 362 from passing through the chain link adapter 300. The part of the top portion 346 that abuts the top link 360 and the bottom link 362 may be referred to as the barrier portion 364. The barrier portion 364 may be made of a first barrier portion 350 and a second barrier portion 352. The first barrier portion 350 and the second barrier portion 352 are located on either side of the chain securing slot 340 and adjacent to the chain securing slot 340. The barrier portion 364 may refer to the entire portion of the top portion 346 preventing movement of the chain link adapter 300 along the chain 312, not simply the top surface or the bottom surface.

Figure 3D:
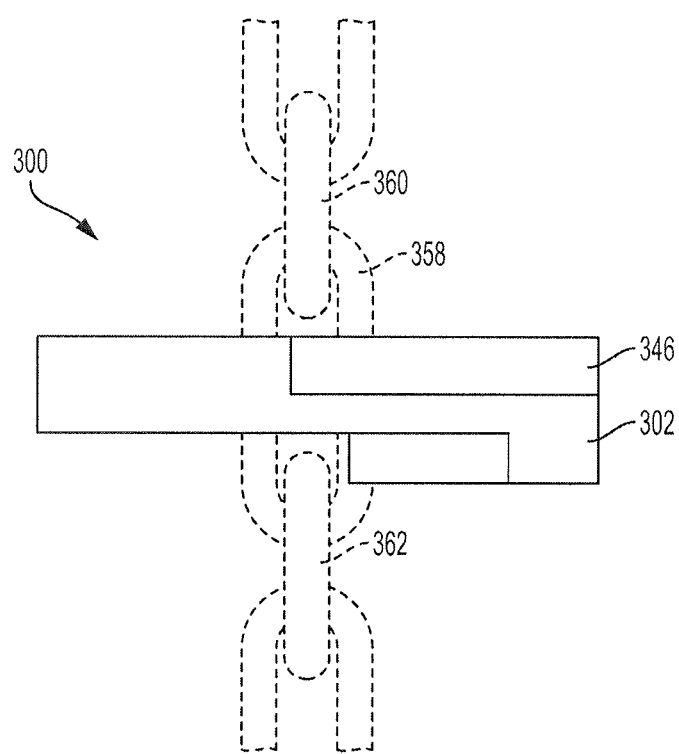

FIG. 3D illustrates a side view of the chain link adapter 300 of FIG. 3C. The top portion 346 when engaged with the base portion 302 surrounds the central link 358 and prevents the top link 360 and the bottom link 362 from passing through the chain link adapter 300.

Figure 3E:
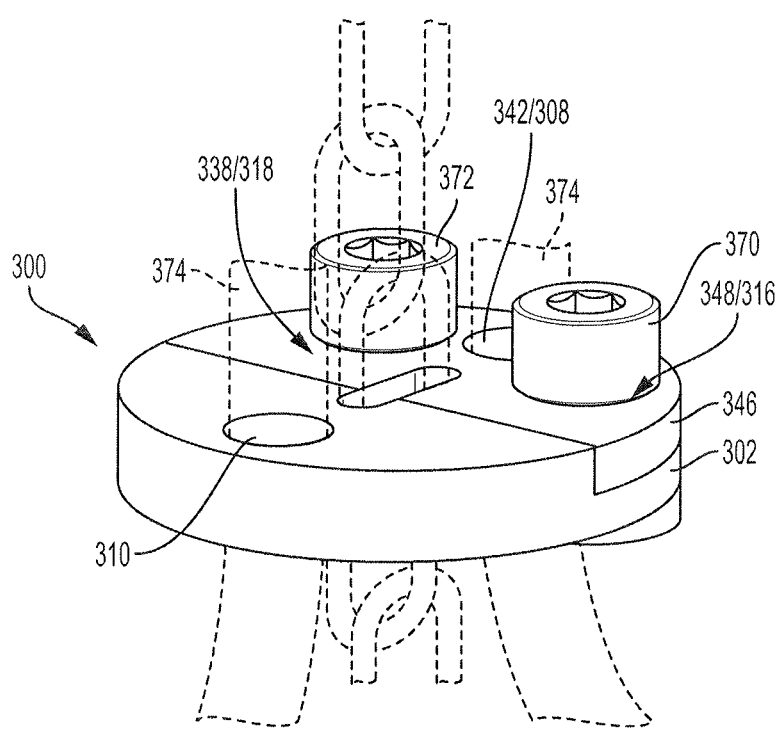

FIG. 3E illustrates the chain link adapter 300 with the top portion 346 secured to the base portion 302. The top portion 346 is secured to the base portion 302 using a first screw 370 located in the first top portion fastener opening 348 that aligns with the first fastener opening 316 of the base portion 302. The top portion 346 is also secured to the base portion 302 using a second screw 372 located in the second top portion fastener opening 338 that aligns with the second fastener opening 318 of the base portion 302. The first screw 370 and the second screw 372 may be screws or bolts or any other fastener used to connect two materials with holes together. A safety cable 374 (e.g., safety cable 206) is threaded through the top portion cable opening 342 that aligns with the first cable opening 308 of the base portion 302 and the second cable opening 310 of the base portion 302.

FIGS. 4A-4J illustrate the components of the chain link adapter. The chain link adapter 400 of FIGS. 4A-4J is similar to the chain link adapter 300 of FIGS. 3A-3E, and like components are numbered similarly.

Figure 4A:
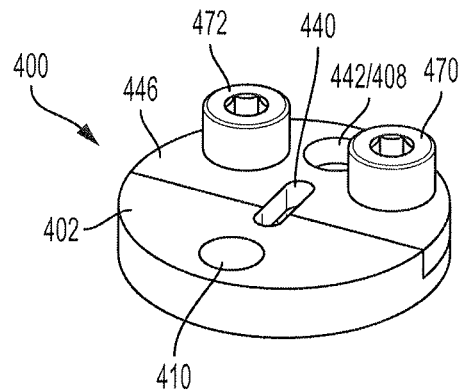
FIGS. 4A-4J illustrate various views of the chain link adapter, according to various embodiments of the invention.

FIG. 4A illustrates the chain link adapter 400 in its assembled state. The chain link adapter 400 includes a base portion 402 covered by a top portion 446, the top portion 446 being removably coupled to the base portion 402 by a first screw 470 and a second screw 472. The chain link adapter 400 includes a top portion cable opening 442 that aligns with a first cable opening 408 of the base portion 402 and a second cable opening 410 of the base portion 402. The cable openings are configured to receive a safety cable, as illustrated in FIGS. 3A-3E. The top portion 446 also includes a chain securing slot 440 configured to surround a link of the chain and prevent vertical movement of the chain link adapter 400, as shown in FIGS. 3C and 3D.

While the chain link adapter 400 is shown as being generally circular in shape, with the base portion 402 being generally circular and the top portion 446 being a semi-circle, the chain link adapter 400 may be any shape (e.g., a square, rectangle, oval, hexagon, pentagon) and the shape may vary based on the application of the chain link adapter. For example, different shapes may be used based on increased weights of objects to be lifted by the hoist, or different shapes may be used based on different dimensions of objects to be lifted by the hoist. In addition, while the chain link adapter 400 has two cable openings (410 and 442/408), in other embodiments, more than two cable openings may be used, particularly when multiple safety cables are used.

Figure 4B:
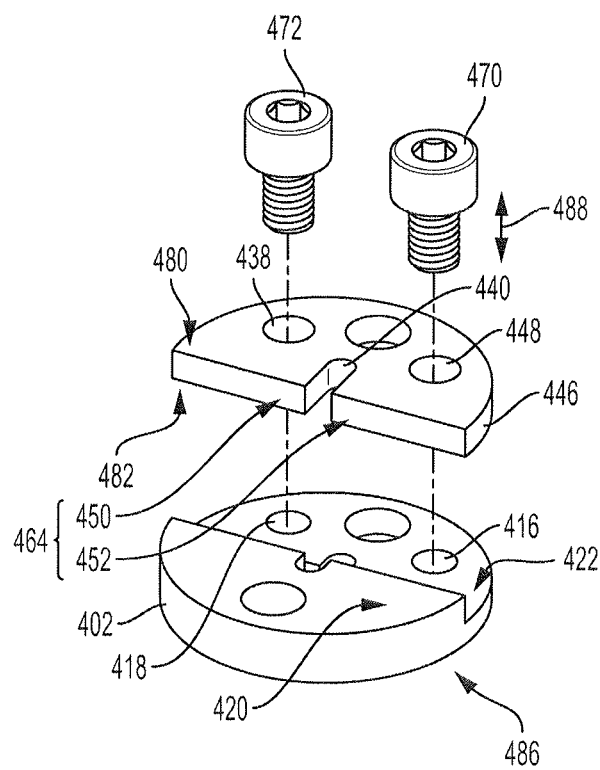

FIG. 4B is an exploded view of the chain link adapter 400. The top portion 446 fits within a basin (or a depression) of the base portion 402. The first screw 470 and the second screw 472 may be threaded, and the first top portion fastener opening 448 and the second top portion fastener opening 438 of the top portion 446 may also be threaded. In addition, the first fastener opening 416 and the second fastener opening 418 of the base portion 402 may also be threaded. The first screw 470 and the second screw 472 may have a screw depth 488. As described herein, any fastener may be used instead of the screws shown in FIG. 4B.

The top portion 446 has a top surface 480 and a bottom surface 482. The base portion 402 has a bottom surface 486. The base portion 402 has two top surfaces that are parallel to each other, but offset—the first top surface 420 and the second top surface 422. The second top surface 422 contacts the bottom surface 482 of the top portion 446 when the top portion 446 is engaged with the base portion 402. In addition, when the top portion 446 is engaged with the base portion 402, the top surface 480 of the top portion 446 is coplanar with the first top surface 420 of the base portion 402.

The top portion 446 has a barrier portion 464 that is configured to limit the vertical movement of the chain link adapter 400 along the chain. The barrier portion 464 may be made of two parts—a first barrier portion 450 and a second barrier portion 452 that are on either side of the chain securing slot 440 and adjacent to the chain securing slot. The chain securing slot secures a central link (e.g., central link 358). The barrier portion 464 abuts the top link above the central link (e.g., top link 360) and also abuts the bottom link below the central link (e.g., bottom link 362). The barrier portion 464 prevents the top link from moving downward below the chain link adapter 400 and prevents the bottom link from moving upward above the chain link adapter 400.

Figure 4C:
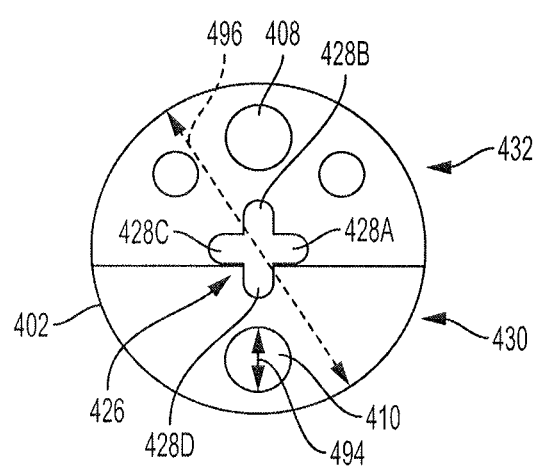

FIG. 4C is a top-down view of the base portion 402. The base portion 402 includes a chain opening 426, which is cross-shaped and has four arms 428A-428D. The first arm 428A, the second arm 428B, and the third arm 428C are located in the second section 432 of the base portion 402, and the fourth arm 428D is located in the first section 430 of the base portion 402. The first cable opening 408 and the second cable opening 410 may have the same diameter 494. The base portion 402 may have a diameter 496. The lower the ratio of the cable opening diameter 494 to the base portion diameter 496, the stronger the base portion 402 may be in supporting the weight of an object attached to the chain link adapter by the safety cable. In some embodiments, the ratio of the cable opening diameter 494 to the base portion diameter 496 is 0.394 to 2. That is, a single cable opening diameter 494 may be 19.7% of the base portion diameter 496. In other embodiments, the ratio of the cable opening diameter 494 to the base portion diameter 496 is less than 0.394 to 2, or put differently, the single cable opening diameter 494 is less than 20% of the base portion diameter 496.

Figure 4D:
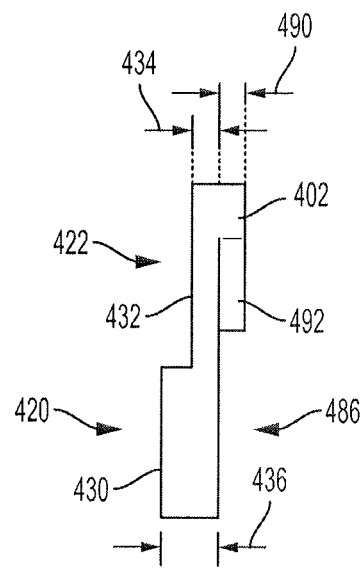

FIG. 4D is a side view of the base portion 402. The base portion 402 includes a screw support 492 that is formed integrally in the base portion 402. The screw support 492 is located below the first fastener opening 416 and the second fastener opening 418 of the base portion 402. The screw support 492 is configured to provide support to the screws (or other fasteners) that attach the top portion 446 to the base portion 402.

The base portion 402 also has a first top surface 420 corresponding to the first section 430, a second top surface 422 corresponding to the second section 432, and a bottom surface 486 opposite the first top surface 420 and the second top surface 422. The screw support 492 extends from the bottom surface 486.

The first section 430 has a thickness 436 and the second section 432 has a thickness 434. The screw support 492 has a thickness 490. The screw support thickness 490 combined with the second section thickness 434 may be substantially similar to the screw depth 488 of the first screw 470 and the second screw 472 (as shown in FIG. 4B). The greater the first section thickness 436 compared to the base portion diameter 496, the stronger the chain link adapter 400 may be in supporting the weight of an object attached to the chain link adapter 400 by the safety cable. In some embodiments, the ratio of the first section thickness 436 to the base portion diameter 496 is 0.343 to 2. That is, the first section thickness 436 may be 17.15% of the base portion diameter 496. In other embodiments, the ratio of the first section thickness 436 to the base portion diameter 496 is greater than 0.343 to 2, or put differently, the first section thickness 436 is greater than 17% of the base portion diameter 496.

Figure 4E:
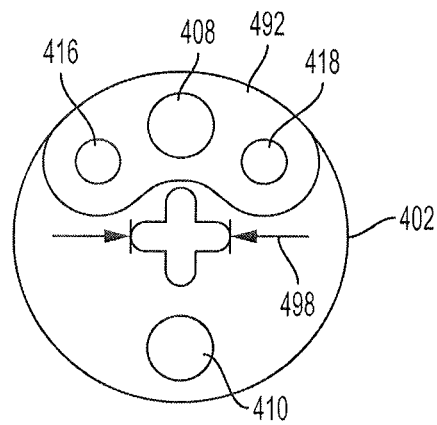

FIG. 4E is a bottom-up view of the base portion 402. The screw support 492 is shaped to surround the first fastener opening 416 and the second fastener opening 418 as well as the first cable opening 408. The width 498 of the chain opening 426 may correspond to the width of a link of the chain passing through the chain link adapter 400.

Figure 4F:
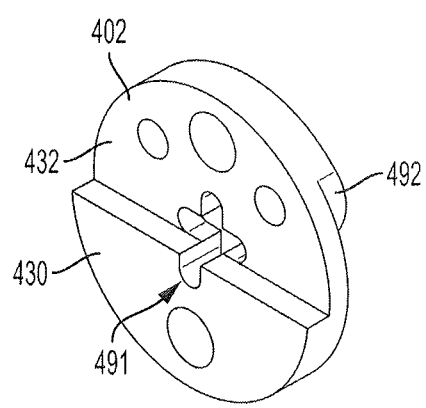

FIG. 4F is a perspective view of the base portion 402. The lip 491 of the chain opening 426 located on the first section 430 of the base portion 402 may have a chamfer or a slope to assist in guiding the chain into the chain opening 426. The chamfer may also assist in avoiding friction between the chain link adapter 400 and the chain that may be caused if the lip 491 had a sharp edge.

Figure 4G:
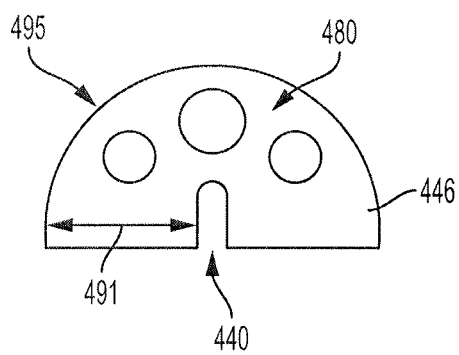

FIG. 4G is a top-down view of the top portion 446, showing the top surface 480 of the top portion 446. The top portion 446 has a shoulder width 491 corresponding to the distance between the chain securing slot 440 to the edge 495 of the top portion 446.

Figure 4H:
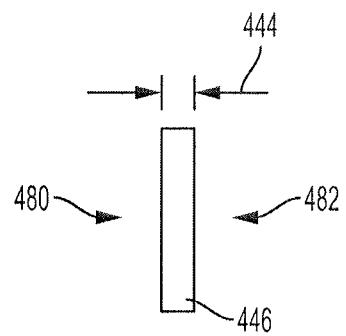

FIG. 4H is a side view of the top portion 446. The top portion 446 has a thickness 444. As the top portion 446 prevents the chain link adapter 400 from moving lengthwise relative to the chain, the greater the top portion thickness 444, the more securely the chain link adapter 400 will be located along the chain. In some embodiments, the ratio of the top portion thickness 444 to the shoulder width 491 is 0.19 to 0.9095. That is, the top portion thickness 444 is 20.89% of the shoulder width 491. In other embodiments, the ratio of the top portion thickness 444 to the shoulder width 491 is greater than 0.19 to 0.9095. That is, the top portion thickness 444 is greater than 20% of the shoulder width 491.

In addition, the greater the top portion thickness 444 relative to the chain link thickness, the more securely the chain link adapter will be located along the chain. The chain link thickness affects the chain opening width 498, and thus, the chain opening width 498 may be used as a proxy for the chain link thickness. In some embodiments, the ratio of the top portion thickness 444 to the chain opening width 498 is 0.19 to 0.591. That is the top portion thickness 444 is 32.15% of the chain opening width 498. In other embodiments, the ratio of the top portion thickness 444 to the chain opening width 498 is greater than 0.19 to 0.591. That is the top portion thickness 444 is greater than 32% of the chain opening width 498.

Figure 4I:
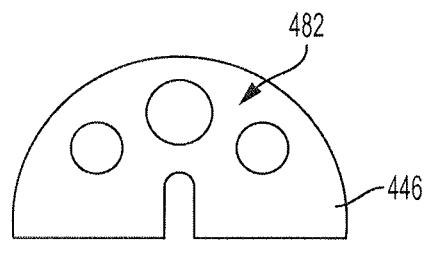

FIG. 4I is a bottom-up view of the top portion 446 showing the bottom surface 482 of the top portion 446.

Figure 4J:
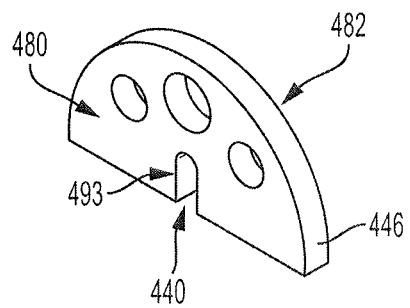

FIG. 4J is a perspective view of the top portion 446. The lip 493 of the chain securing slot 440 may have a chamfer or a slope to assist in guiding the chain into the chain opening 426. The chamfer may also assist in avoiding friction between the chain link adapter and the chain that may be caused if the lip 493 had a sharp edge.

Figure 5A:
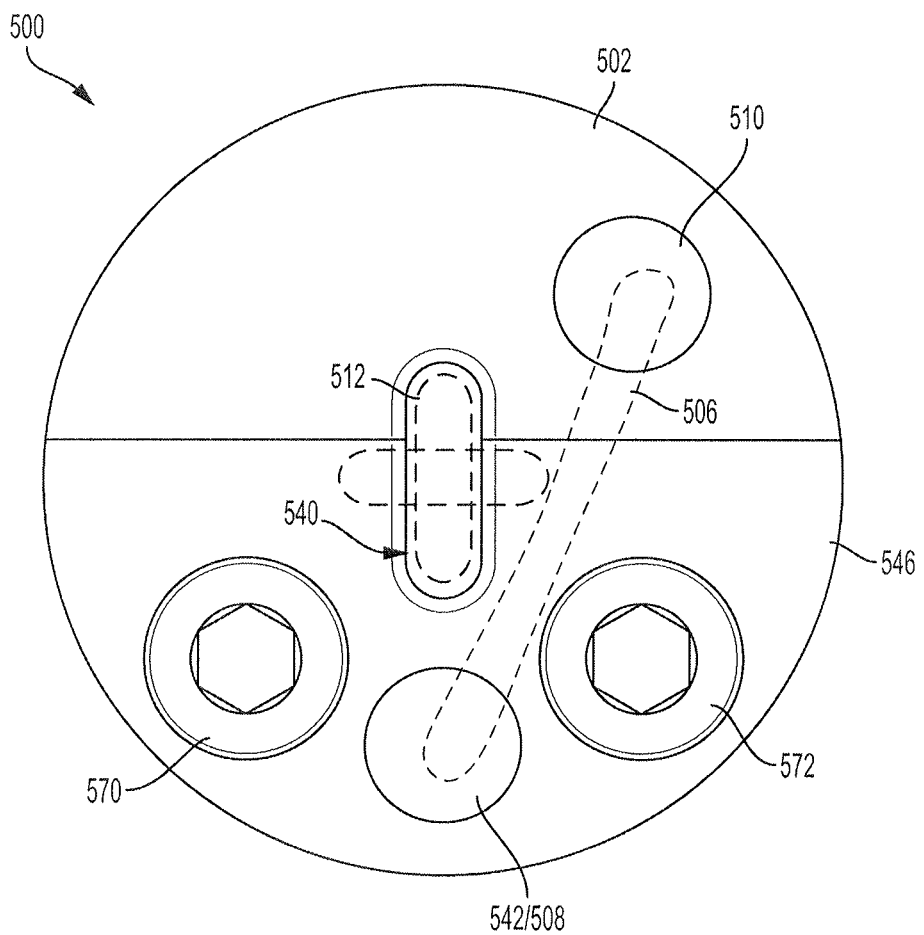
FIGS. 5A-5B illustrate another embodiment of the chain link adapter, according to various embodiments of the invention.
Figure 5B:
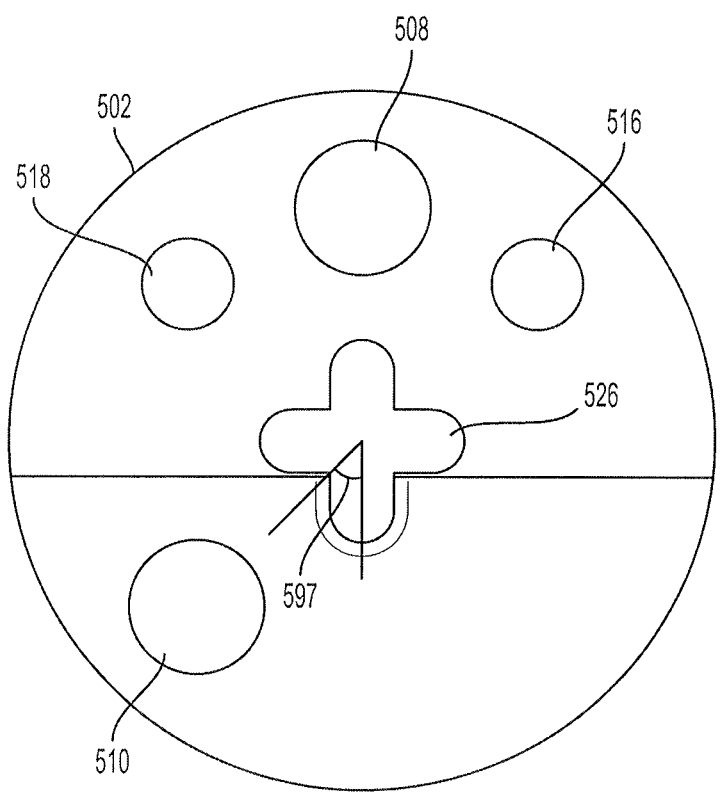

FIGS. 5A-5B illustrate an alternate embodiment of the chain link adapter. The chain link adapter 500 is similar to the chain link adapter 300 and 400, and like parts are numbered similarly.

The chain link adapter 500 includes a top portion 546 having a chain securing slot 540, a first cable opening 542/508 made of a top portion cable opening 542 and a first cable opening 508 of the base portion 502. The top portion 546 is attached to the base portion 502 by a first screw 570 and a second screw 572. Although screws are illustrated, any fastener may be used to attach the top portion 546 to the base portion 502.

The base portion 502 includes a second cable opening 510. The second cable opening 510 is similar in structure to the second cable opening 310 and the second cable opening 410. However, the second cable opening 510 of the chain link adapter 500 is offset from the chain securing slot 540 and the first cable opening 542/508. When the second cable opening 510 is offset from the first cable opening 542/508, the safety cable 506 that passes from the second cable opening 510 to the first cable opening 542/508 above the chain link adapter 500 may come into less contact with the chain 512 or may not come into contact with the chain 512 at all.

FIG. 5B is a top-down view of the base portion 502. The base portion 502 includes a first fastener opening 516 and a second fastener opening 518, as well as a first cable opening 508 and a second cable opening 510. As shown in FIG. 5B, the second cable opening 510 is offset by an offset angle 597 from an axis formed by the chain opening 526 and the first cable opening 508. That is, if a first line is drawn from the center of the first cable opening 508 to the center of the chain opening 526, and a second line is drawn from the center of the second cable opening to the center of the chain opening 526, the first line and the second line would form the offset angle 597. In some embodiments, the offset angle 597 is 45 degrees.

Figure 6:
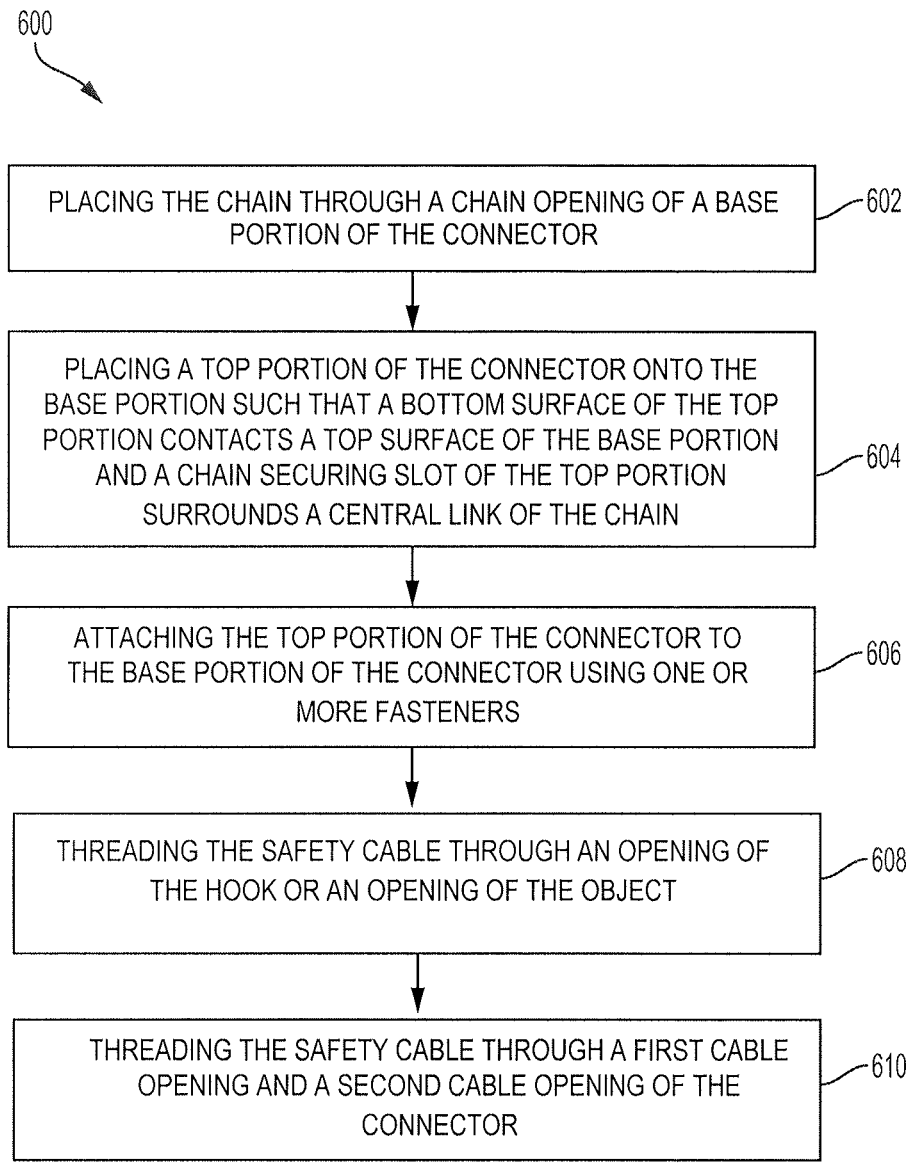
FIG. 6 illustrates a flowchart for using the chain link adapter to connect a safety cable to a chain of a hoist, according to various embodiments of the invention.

FIG. 6 illustrates a flowchart of a process 600 for securing a safety cable to a chain of a hoist. The hoist includes the chain and a hook, with the hook configured to engage an opening of an object to be lifted by the hoist.

The chain of the hoist is placed through a chain opening of a base portion of the connector (e.g., chain link adapter 300, 400, 500) (step 602). This is illustrated in FIGS. 3A and 3B. The base portion may move freely along the length of the chain, and may be moved to a location that is sufficiently above where the hook is connected to the chain, such that if the hook was to be disconnected from the chain, the chain would not break at or above the location where the connector is attached to the chain.

The top portion of the connector is placed onto the base portion of the connector (step 604). This is illustrated in FIGS. 3C and 3D. The bottom surface of the top portion contacts a top surface of the base portion, and a chain securing slot of the top portion surrounds a central link of the chain. The barrier portion of the top portion, as described herein, prevents the vertical movement of the connector along the chain by contacting and abutting a top link above the central link and a bottom link below the central link.

The top portion of the connector is attached to the base portion of the connector using one or more fasteners (step 606). This is illustrated in FIG. 3E. The fasteners may be screws or bolts or any other fastener. The fasteners may be removable such that the top portion is removably coupled to the base portion, and the location of the connector along the chain of the hoist may be adjusted.

The safety cable is threaded through an opening of the hook or an opening of the object (step 608). This is illustrated in FIG. 2. The safety cable is also threaded through a first cable opening and a second cable opening of the connector (step 610). This is illustrated in FIGS. 2 and 3E. The ends of the safety cable may be attached to the body of the safety cable in order to form a closed loop. As the safety cable no longer has to pass through the chain link opening (as shown in FIG. 1), the safety cable may be thicker and stronger than conventional safety cables used.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A connector for securing a safety cable to a chain, the connector comprising:
   a base portion having:
      a chain opening formed in the shape of a cross and configured to receive the chain such that the base portion freely moves along the length of the chain, and
      a first cable opening configured to receive the safety cable; and
   a top portion configured to be coupled to the base portion and cover a portion of the chain opening such that the base portion and the top portion, when coupled together, remain at a substantially fixed position along the length of the chain.

2. The connector of claim 1, wherein the top portion includes:
   a chain securing slot shaped to surround a portion of a link of the chain, and
   a barrier portion adjacent to the chain securing slot and configured to abut a top link and a bottom link adjacent to the link surrounded by the chain securing slot to prevent movement of the top portion along the length of the chain.

3. The connector of claim 1, wherein the top portion includes a top portion cable opening configured to receive the safety cable, and the top portion is aligned with the base portion such that the top portion cable opening is aligned with the first cable opening of the base portion.

4. The connector of claim 3, wherein the base portion includes a second cable opening configured to receive the safety cable, such that the safety cable passes through the first cable opening and the second cable opening.

5. The connector of claim 4, wherein the chain opening is located in a substantially central area of the base portion between the first cable opening and the second cable opening.

6. The connector of claim 4, wherein the second cable opening is offset by an offset angle from an axis formed by the first cable opening and the chain opening.

7. The connector of claim 6, wherein the offset angle is 45 degrees.

8. The connector of claim 1, wherein the top portion is removably coupled to the base portion by at least one of screws or bolts.

9. The connector of claim 1, wherein the base portion is substantially circular in shape and the top portion has a semi-circle shape, the base portion further including a basin to receive the top portion.

10. A system for providing safety to a hoist having a hook attached to a chain, the system comprising:
    a connector having a base portion with a first top surface extending along a first plane and a second top surface extending along a second plane parallel to the first plane, the first plane and the second plane separated by a height, the base portion having:
       a chain opening configured to receive the chain such that the base portion freely moves along a length of the chain, and
       a first cable opening on the second top surface; and
    a safety cable threaded through at least one of the first top surface, the second top surface, an opening of the hook, or an opening of an object lifted by the hoist,
    the connector connected to the safety cable and the chain such that when the hook and the chain of the hoist are disconnected, the object remains connected to the chain via the connector and the safety cable.

11. The system of claim 10, wherein the connector includes:
    a top portion configured to be coupled to the base portion and cover a portion of the chain opening such that the base portion and the top portion, when coupled together, remain at a substantially fixed position along the length of the chain.

12. The system of claim 11, wherein the top portion includes:
    a chain securing slot shaped to surround a portion of a link of the chain, and
    a barrier portion adjacent to the chain securing slot and configured to abut a top link and a bottom link adjacent to the link surrounded by the chain securing slot to prevent movement of the top portion along the length of the chain.

13. The system of claim 11, wherein the top portion includes a top portion cable opening configured to receive the safety cable, and the top portion is aligned with the base portion such that the top portion cable opening is aligned with the first cable opening of the base portion.

14. The system of claim 13, wherein the base portion includes a second cable opening configured to receive the safety cable, such that the safety cable passes through the first cable opening and the second cable opening.

15. The system of claim 14, wherein the chain opening is located in a substantially central area of the base portion between the first cable opening and the second cable opening.

16. The system of claim 14, wherein the second cable opening is offset by an offset angle from an axis formed by the first cable opening and the chain opening.

17. The system of claim 16, wherein the offset angle is 45 degrees.

18. The system of claim 11, wherein the top portion is removably coupled to the base portion by at least one of screws or bolts.

19. A method for using a connector to secure a safety cable to a chain of a hoist, the chain connected to a hook for engaging an object to be lifted by the hoist, the method comprising:

placing the chain through a chain opening of a base portion of the connector, the chain opening formed in the shape of a cross;

placing a top portion of the connector onto the base portion such that a bottom surface of the top portion contacts a top surface of the base portion and a chain securing slot of the top portion surrounds a central link of the chain;

attaching the top portion of the connector to the base portion of the connector using one or more fasteners;

threading the safety cable through an opening of the hook or an opening of the object; and threading the safety cable through a first cable opening and a second cable opening of the connector.

* * * * *